(12) United States Patent
Lee et al.

(10) Patent No.: US 11,570,839 B2
(45) Date of Patent: *Jan. 31, 2023

(54) METHOD AND DEVICE FOR INDICATING TYPE OF BEARER USED FOR NEXT MESSAGE IN WIRELESS COMMUNICATION SYSTEM

(71) Applicant: LG Electronics Inc., Seoul (KR)

(72) Inventors: Youngdae Lee, Seoul (KR); Hongsuk Kim, Seoul (KR); Sangwon Kim, Seoul (KR); Jaewook Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 17/222,483

(22) Filed: Apr. 5, 2021

(65) Prior Publication Data
US 2021/0227616 A1 Jul. 22, 2021

Related U.S. Application Data

(63) Continuation of application No. 16/496,864, filed as application No. PCT/KR2018/003417 on Mar. 23, 2018, now Pat. No. 10,980,081.

(Continued)

(51) Int. Cl.
*H04W 72/00* (2009.01)
*H04W 76/27* (2018.01)
(Continued)

(52) U.S. Cl.
CPC .......... *H04W 76/27* (2018.02); *H04W 24/10* (2013.01); *H04W 28/0252* (2013.01); *H04W 74/0833* (2013.01); *H04W 88/06* (2013.01)

(58) Field of Classification Search
CPC . H04W 28/0252; H04W 76/27; H04W 16/10; H04W 76/10; H04W 72/04
See application file for complete search history.

(56) References Cited

U.S. PATENT DOCUMENTS

| 9,980,159 B2 | 5/2018 | Tseng |
| 10,172,179 B2 | 1/2019 | Van Lieshout et al. |

(Continued)

FOREIGN PATENT DOCUMENTS

| JP | 2014116983 | 6/2014 |
| JP | 2016513431 | 5/2016 |

(Continued)

OTHER PUBLICATIONS

Office Action in Chinese Appln. No. 201880019297.2, dated Apr. 20, 2022, 13 pages (with English translation).

(Continued)

*Primary Examiner* — Shantell L Heiber
(74) *Attorney, Agent, or Firm* — Fish & Richardson P.C.

(57) ABSTRACT

Provided are a method and a device for receiving information indicating the type of a signaling radio bearer (SRB) in a wireless communication system. A user equipment (UE): receives a first radio resource control (RRC) message including information indicating the type of SRB on which a second RRC message, which is a message corresponding to the first RRC message, is to be transmitted; and transmits the second RRC message via the type of SRB indicated by the information indicating the type of SRB. Accordingly, the type of bearer on which a first message is received and the type of bearer on which a second message is transmitted in a single RRC procedure may be identical or mutually different.

15 Claims, 15 Drawing Sheets

Related U.S. Application Data

(60) Provisional application No. 62/502,615, filed on May 6, 2017, provisional application No. 62/502,614, filed on May 6, 2017, provisional application No. 62/480,362, filed on Apr. 1, 2017, provisional application No. 62/475,866, filed on Mar. 24, 2017, provisional application No. 62/475,812, filed on Mar. 23, 2017.

(51) Int. Cl.
*H04W 24/10* (2009.01)
*H04W 28/02* (2009.01)
*H04W 74/08* (2009.01)
*H04W 88/06* (2009.01)

(56) References Cited

U.S. PATENT DOCUMENTS

| | | |
|---|---|---|
| 2012/0281548 A1* | 11/2012 | Lin .................. H04W 36/305 370/242 |
| 2014/0036685 A1 | 2/2014 | Kim et al. |
| 2014/0056243 A1 | 2/2014 | Pelletier et al. |
| 2015/0173047 A1 | 6/2015 | Yamada |
| 2015/0215944 A1* | 7/2015 | Kim .................. H04L 5/001 370/329 |
| 2015/0215965 A1* | 7/2015 | Yamada ............. H04W 76/22 370/329 |
| 2015/0264562 A1 | 9/2015 | Wu |
| 2016/0183151 A1 | 6/2016 | Wu |
| 2016/0212753 A1* | 7/2016 | Wu .................. H04L 5/0032 |
| 2016/0219603 A1 | 7/2016 | Fujishiro et al. |
| 2016/0262194 A1 | 9/2016 | Zhang et al. |
| 2016/0302075 A1 | 10/2016 | Dudda et al. |
| 2016/0302256 A1 | 10/2016 | Susitaival et al. |
| 2017/0013668 A1 | 1/2017 | Chang et al. |
| 2017/0127331 A1* | 5/2017 | Wu .................. H04W 76/27 |
| 2017/0134297 A1* | 5/2017 | Johansson ............. H04W 80/02 |
| 2017/0215225 A1 | 7/2017 | Yi et al. |
| 2017/0222876 A1* | 8/2017 | Van Der Velde ... H04L 41/0816 |
| 2018/0035339 A1 | 2/2018 | Mitsui et al. |
| 2019/0289510 A1 | 9/2019 | Rugeland et al. |
| 2020/0037382 A1 | 1/2020 | Xiao et al. |

FOREIGN PATENT DOCUMENTS

| | | |
|---|---|---|
| JP | 2016519875 | 7/2016 |
| WO | WO2015070445 | 5/2015 |

OTHER PUBLICATIONS

Susitaival, "LS on security in E-UTRA-NR Dual Connectivity," Tdoc R2-1702442, Presented at 3GPP TSG-RAN WG2 #97, Athens, Greece, Feb. 13-17, 2017, 2 pages.

3rd Generation Partnership Project; Technical Specification Group Radio Access Network, "Study on New Radio {NR) access technology (Release 14)", 3GPP TR 38.912 V14.0.0, Mar. 2017, 74 pages.

EP Supplementary Search Report in European Application No. EP 18772692, dated Jan. 28, 2020, 10 pages.

Ericsson, "RRC signaling transport for L TE-NR interworking not involving coordination", R2-1700917, 3GPP TSG-RAN WG2 #97 Athens, Greece, Feb. 13-17, 2017, 6 pages.

Intel Corporation (Rapporteur), "Report of email discussion: [94#39][NR] C plane aspects for tight interworking", R2-165012, 3GPP TSG-RAN WG2 Meeting #95 Gothenburg, Sweden, Aug. 22-26, 2016, 38 pages.

Japanese Office Action in Japanese Patent Appln. No. 2019-552276, dated Oct. 20, 2020, 8 pages (with English translation).

LG Electronics Inc., "Supplementary SRB in MCG failure for NR," R2-1701639, 3GPP TSG-RAN WG2 #97, Athens, Greece, Feb. 4, 2017, 5 pages.

NEC, "Direct RRC signaling on SCG in LTE-NR Dual Connectivity," R2-1701947, 3GPP TSG-RAN WG2 #97, Athens, Greece, Feb. 4, 2017, 5 pages.

NTT DOCOMO, Inc. (Rapporteur), "[97#53][NR]RAN2/3 part of Text Proposal to TR 38.912," R2-1702431, 3GPP TSG-RAN WG2 #97, Athens, Greece, Mar. 3, 2017, 50 pages.

Qualcomm Incorporated, "Considerations on SgNB RRM handling," R2-1701786, 3GPP TSG-RAN WG2 Meeting #97, Athens, Greece, Feb. 4, 2017, 9 pages.

Ericsson, "RRC procedures and L2 handling in dual connectivity," 3GPP TSG-RAN WG2 #87, Tdoc R2-143505, Dresden, Germany, Aug. 18-22, 2014, 6 pages.

Huawei et al., "Correction on keeping SCG upon inter eNB handove," 3GPP TSG-RAN WG2 Meeting #94, R2-164246, Nanjing, China, May 23-27, 2016, 3 pages.

Office Action in Japanese Application No. 2021-099283, dated Aug. 23, 2022, 4 pages (with English translation).

Ericsson, "SCG split bearer," 3GPP TSG-RAN WG2 #96, Tdoc R2-168304, Reno, Nevada, USA, Nov. 14-18, 2016, 2 pages.

Office Action in Chinese Application No. 201880019297.2, dated Aug. 30, 2022, 8 pages (with English translation).

* cited by examiner

METHOD AND DEVICE FOR INDICATING TYPE OF BEARER USED FOR NEXT MESSAGE IN WIRELESS COMMUNICATION SYSTEM

CROSS-REFERENCE TO RELATED APPLICATIONS

This application is a continuation of U.S. application Ser. No. 16/496,864, filed on Sep. 23, 2019, which is a National Stage filing under 35 U.S.C. 371 of International Application No. PCT/KR2018/003417, filed on Mar. 23, 2018, which claims the benefit of U.S. Provisional Applications No. 62/475,812 filed on Mar. 23, 2017, No. 62/475,866 filed on Mar. 24, 2017, No. 62/480,362 filed on Apr. 1, 2017, No. 62/502,615 filed on May 6, 2017 and No. 62/502,614 filed on May 6, 2017 the contents of which are all hereby incorporated by reference herein in their entirety.

BACKGROUND OF THE INVENTION

Field of the Invention

The present invention relates to wireless communication and, more particularly, to a method and device for indicating the type of a bearer used for the next message in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. The NR system may be called another name, e.g. new radio access technology (new RAT). 3GPP has to identify and develop the technology components needed for successfully standardizing the NR timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

According to new architecture for the 5G core network and 5G radio access network (RAN) including NR, a user equipment (UE) may receive a better service in view of throughput and UE experience. Also, tight interworking of LTE/NR is under discussion. Due to tight interworking of LTE/NR, interworking between an eNodeB (eNB) and a new RAN node (for example, gNB) is allowed, and as a result, throughput of a UE may be improved. An eNB of the LTE and gNB of the NR may manage resources individually. More specifically, dual/multiple connections for improving throughput of a UE according to the tight interworking of LTE/NR may be used, and signaling for UE mobility may be simplified.

SUMMARY OF THE INVENTION

In the conventional LTE system, a message belonging to one radio resource control (RRC) procedure is allowed to be exchanged only between a UE and one network node. However, in the case of interworking of LTE/NR, a message belonging to one RRC procedure needs to be exchanged among a UE and two or more different network nodes.

In an aspect, a method for receiving information indicating a type of a signaling radio bearer (SRB) by a user equipment (UE) in a wireless communication system is provided. The method includes receiving a first radio resource control (RRC) message including the information indicating the type of the SRB through which a second RRC message, which is a message corresponding to the first RRC message, is to be transmitted, and transmitting the second RRC message through the SRB of which type is indicated by the information indicating the type of the SRB.

In another aspect, a user equipment (UE) in a wireless communication system is provided. The UE includes a memory, a transceiver, and a processor connected to the memory and the transceiver. The processor is configured to control the transceiver to receive a first radio resource control (RRC) message including the information indicating the type of the SRB through which a second RRC message, which is a message corresponding to the first RRC message, is to be transmitted, and control the transceiver to transmit the second RRC message through the SRB of which the type is indicated by the information indicating the type of the SRB.

The type of a bearer used for a second message corresponding to a first message in one RRC procedure may be indicated effectively.

DESCRIPTION OF EXEMPLARY EMBODIMENTS

Hereinafter, in the present invention, a wireless communication system based on a 3rd generation partnership project (3GPP) or institute of electrical and electronics engineers (IEEE) is mainly described. However, the present invention is not limited thereto, and the present invention may be applied to other wireless communication systems having the same characteristics to be described hereinafter.

Figure 1:
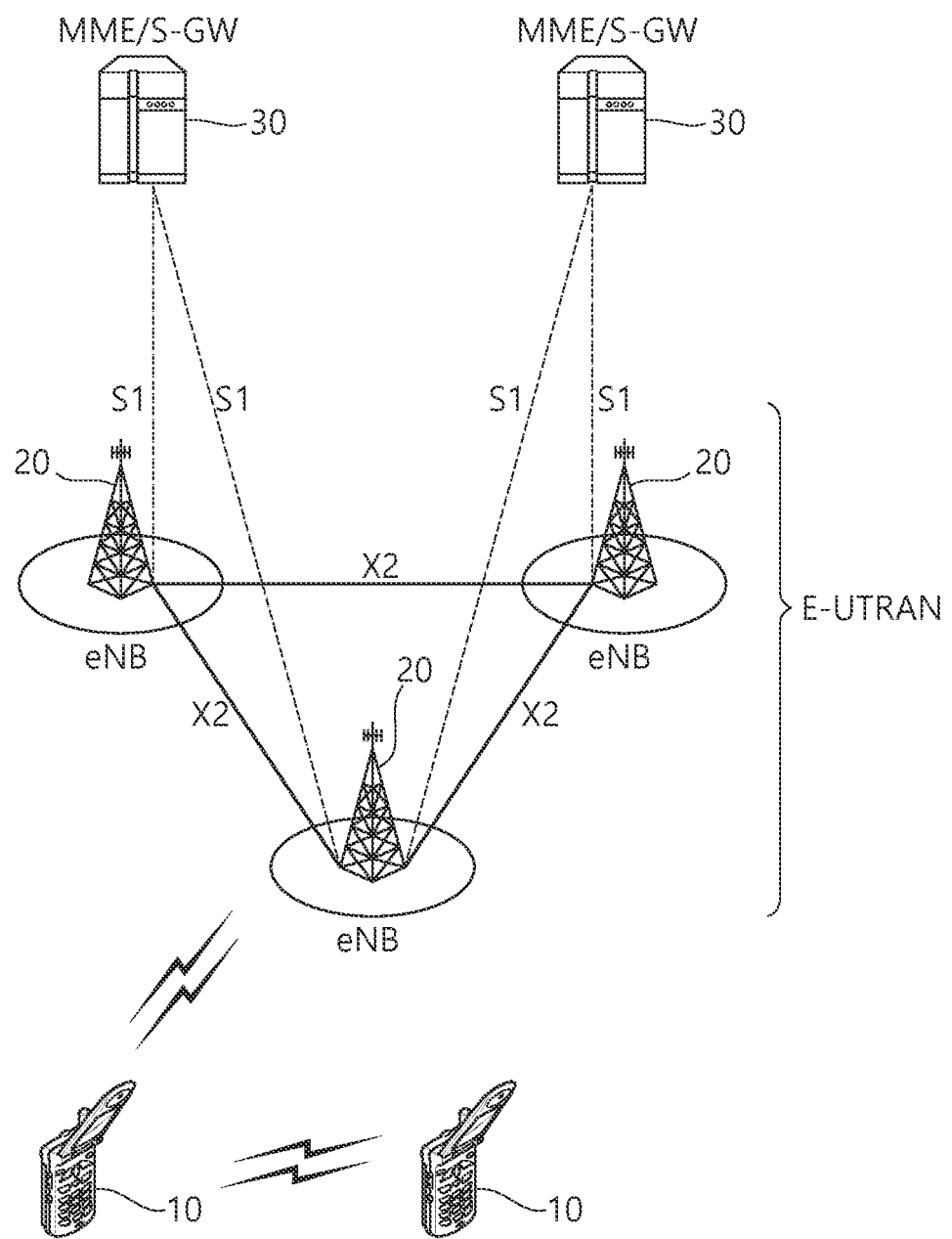
FIG. 1 shows 3GPP LTE system architecture.

FIG. 1 shows 3GPP LTE system architecture. Referring to FIG. 1, the 3GPP long-term evolution (LTE) system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), an access point, etc. One eNB 20 may be deployed per cell.

Hereinafter, a downlink (DL) denotes communication from the eNB 20 to the UE 10. An uplink (UL) denotes communication from the UE 10 to the eNB 20. A sidelink (SL) denotes communication between the UEs 10. In the DL, a transmitter may be a part of the eNB 20, and a receiver may be a part of the UE 10. In the UL, the transmitter may be a part of the UE 10, and the receiver may be a part of the eNB 20. In the SL, the transmitter and receiver may be a part of the UE 10.

The EPC includes a mobility management entity (MME) and a serving gateway (S-GW). The MME/S-GW 30 provides an end point of session and mobility management function for the UE 10. For convenience, MME/S-GW 30 will be referred to herein simply as a "gateway," but it is understood that this entity includes both the MME and S-GW. A packet data network (PDN) gateway (P-GW) may be connected to an external network.

The MME provides various functions including non-access stratum (NAS) signaling to eNBs 20, NAS signaling security, access stratum (AS) security control, inter core network (CN) node signaling for mobility between 3GPP access networks, idle mode UE reachability (including control and execution of paging retransmission), tracking area list management (for UE in idle and active mode), packet data network (PDN) gateway (P-GW) and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on access point name aggregate maximum bit rate (APN-AMBR).

Interfaces for transmitting user traffic or control traffic may be used. The UE 10 is connected to the eNB 20 via a Uu interface. The UEs 10 are connected to each other via a PC5 interface. The eNBs 20 are connected to each other via an X2 interface. Neighboring eNBs may have a meshed network structure that has the X2 interface. The eNB 20 is connected to the gateway 30 via an S1 interface.

Figure 2:
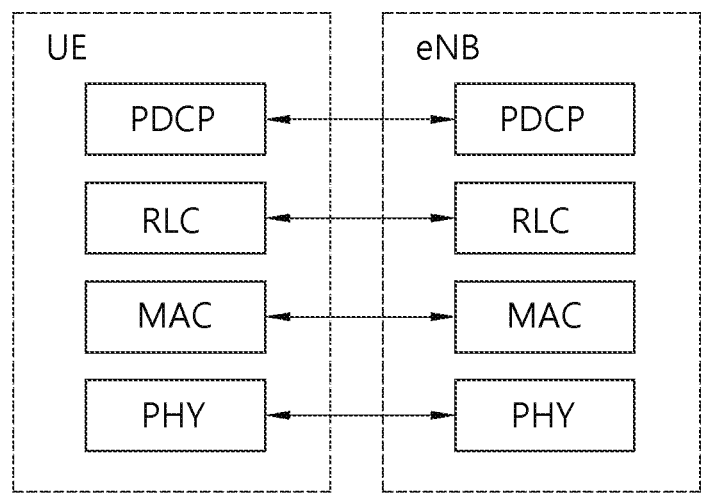
FIG. 2 shows a block diagram of a user plane protocol stack of an LTE system.
Figure 3:
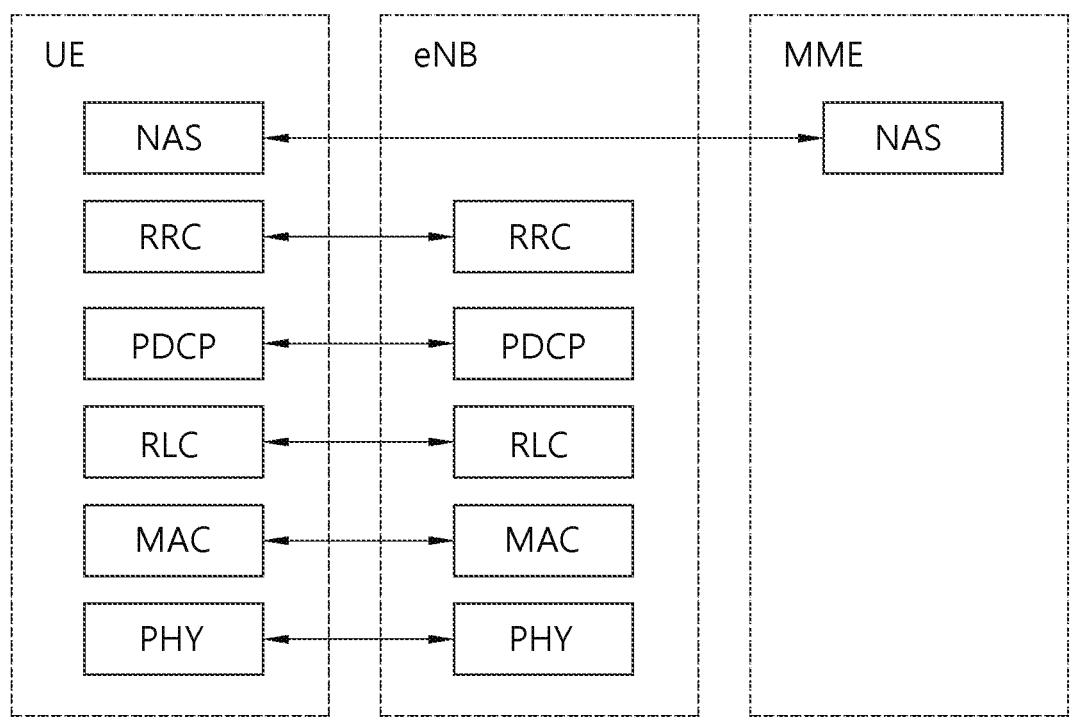
FIG. 3 shows a block diagram of a control plane protocol stack of an LTE system.

FIG. 2 shows a block diagram of a user plane protocol stack of an LTE system. FIG. 3 shows a block diagram of a control plane protocol stack of an LTE system. Layers of a radio interface protocol between the UE and the E-UTRAN may be classified into a first layer (L1), a second layer (L2), and a third layer (L3) based on the lower three layers of the open system interconnection (OSI) model that is well-known in the communication system.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data between the MAC layer and the PHY layer is transferred through the transport channel. Between different PHY layers, i.e., between a PHY layer of a transmission side and a PHY layer of a reception side, data is transferred via the physical channel.

A MAC layer, a radio link control (RLC) layer, and a packet data convergence protocol (PDCP) layer belong to the L2. The MAC layer provides services to the RLC layer, which is a higher layer of the MAC layer, via a logical channel. The MAC layer provides data transfer services on logical channels. The RLC layer supports the transmission of data with reliability. Meanwhile, a function of the RLC layer may be implemented with a functional block inside the MAC layer. In this case, the RLC layer may not exist. The PDCP layer provides a function of header compression function that reduces unnecessary control information such that data being transmitted by employing IP packets, such as IPv4 or Ipv6, can be efficiently transmitted over a radio interface that has a relatively small bandwidth.

A radio resource control (RRC) layer belongs to the L3. The RLC layer is located at the lowest portion of the L3, and is only defined in the control plane. The RRC layer controls logical channels, transport channels, and physical channels in relation to the configuration, reconfiguration, and release of radio bearers (RBs). The RB signifies a service provided the L2 for data transmission between the UE and E-UTRAN.

Referring to FIG. 2, the RLC and MAC layers (terminated in the eNB on the network side) may perform functions such as scheduling, automatic repeat request (ARQ), and hybrid ARQ (HARQ). The PDCP layer (terminated in the eNB on the network side) may perform the user plane functions such as header compression, integrity protection, and ciphering.

Referring to FIG. 3, the RLC and MAC layers (terminated in the eNB on the network side) may perform the same functions for the control plane. The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

A physical channel transfers signaling and data between PHY layer of the UE and eNB with a radio resource. A physical channel consists of a plurality of subframes in time domain and a plurality of subcarriers in frequency domain. One subframe, which is 1 ms, consists of a plurality of symbols in the time domain. Specific symbol(s) of the subframe, such as the first symbol of the subframe, may be used for a physical downlink control channel (PDCCH). The PDCCH carries dynamic allocated resources, such as a physical resource block (PRB) and modulation and coding scheme (MCS).

A DL transport channel includes a broadcast channel (BCH) used for transmitting system information, a paging channel (PCH) used for paging a UE, a downlink shared channel (DL-SCH) used for transmitting user traffic or control signals, a multicast channel (MCH) used for multicast or broadcast service transmission. The DL-SCH supports HARQ, dynamic link adaptation by varying the modulation, coding and transmit power, and both dynamic and semi-static resource allocation. The DL-SCH also may enable broadcast in the entire cell and the use of beamforming.

A UL transport channel includes a random access channel (RACH) normally used for initial access to a cell, and an uplink shared channel (UL-SCH) for transmitting user traffic or control signals. The UL-SCH supports HARQ and dynamic link adaptation by varying the transmit power and potentially modulation and coding. The UL-SCH also may enable the use of beamforming.

The logical channels are classified into control channels for transferring control plane information and traffic channels for transferring user plane information, according to a type of transmitted information. That is, a set of logical channel types is defined for different data transfer services offered by the MAC layer.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting multimedia broadcast multicast services (MBMS) control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both UL and DL. The MTCH is a point-to-multipoint downlink channel for transmitting traffic data from the network to the UE.

UL connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RRC state indicates whether an RRC layer of the UE is logically connected to an RRC layer of the E-UTRAN. The RRC state may be divided into two different states such as an RRC idle state (RRC_IDLE) and an RRC connected state (RRC_CONNECTED). In RRC_IDLE, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE, no RRC context is stored in the eNB.

In RRC_CONNECTED, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED, the E-UTRAN knows the cell to which the UE belongs. Therefore, the network can transmit and/or receive data to/from UE, the network can control mobility (handover and inter-radio access technologies (RAT) cell change in order to GSM EDGE radio access network (GERAN) with network assisted cell change (NACC)) of the UE, and the network can perform cell measurements for a neighboring cell.

In RRC_IDLE, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion. A paging message is transmitted over all cells belonging to the same tracking area. If the UE moves from one tracking area (TA) to another TA, the UE will send a tracking area update (TAU) message to the network to update its location.

5G system is a 3GPP system consisting of 5G access network (AN), 5G core network (CN) and UE. 5G access network is an access network comprising a next generation radio access network (NG-RAN) and/or non-3GPP access network connecting to a 5G core network. NG-RAN is a radio access network that supports one or more of the following options with the common characteristics that it connects to 5G core network:
1) Standalone new radio (NR).
2) NR is the anchor with E-UTRA extensions.
3) Standalone E-UTRA.
4) E-UTRA is the anchor with NR extensions.

Figure 4:
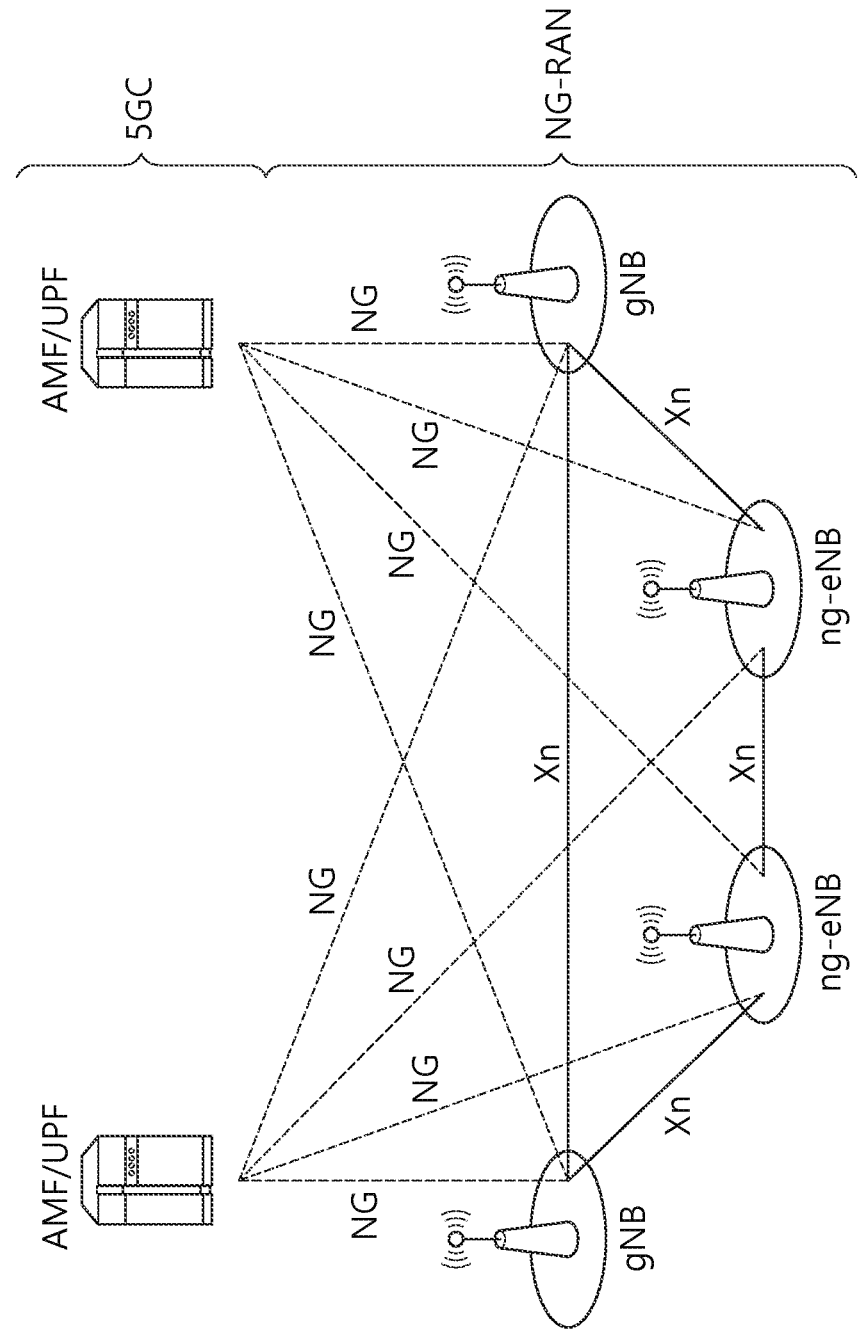
FIG. 4 shows an NG-RAN architecture.

FIG. 4 shows an NG-RAN architecture. Referring to FIG. 4, the NG-RAN includes at least one NG-RAN node. The NG-RAN node includes at least one gNB and/or at least one ng-eNB. The gNB provides NR user plane and control plane protocol terminations towards the UE. The ng-eNB provides E-UTRA user plane and control plane protocol terminations towards the UE. The gNBs and ng-eNBs are interconnected with each other by means of the Xn interface. The gNBs and ng-eNBs are also connected by means of the NG interfaces to the 5G CN. More specifically, the gNBs and ng-eNBs are connected to the access and mobility management function (AMF) by means of the NG-C interface and to the user plane function (UPF) by means of the NG-U interface.

The gNB and ng-eNB host the following functions:
Functions for radio resource management: Radio bearer control, radio admission control, connection mobility control, dynamic allocation of resources to UEs in both uplink and downlink (scheduling);

Internet protocol (IP) header compression, encryption and integrity protection of data;

Selection of an AMF at UE attachment when no routing to an AMF can be determined from the information provided by the UE;

Routing of user plane data towards UPF(s);

Routing of control plane information towards AMF;

Connection setup and release;

Scheduling and transmission of paging messages;

Scheduling and transmission of system broadcast information (originated from the AMF or operations & maintenance (O&M));

Measurement and measurement reporting configuration for mobility and scheduling;

Transport level packet marking in the uplink;

Session management;

Support of network slicing;

QoS flow management and mapping to data radio bearers;

Support of UEs in RRC_INACTIVE state;

Distribution function for non-assess stratum (NAS) messages;

Radio access network sharing;

Dual connectivity;

Tight interworking between NR and E-UTRA.

The AMF hosts the following main functions:

NAS signaling termination;

NAS signaling security;

AS security control;

Inter CN node signaling for mobility between 3GPP access networks;

Idle mode UE reachability (including control and execution of paging retransmission);

Registration area management;

Support of intra-system and inter-system mobility;

Access authentication;

Access authorization including check of roaming rights;

Mobility management control (subscription and policies);

Support of network slicing;

Session management function (SMF) selection.

The UPF hosts the following main functions:

Anchor point for Intra-/Inter-radio access technology (RAT) mobility (when applicable);

External protocol data unit (PDU) session point of interconnect to data network;

Packet routing & forwarding;

Packet inspection and user plane part of policy rule enforcement;

Traffic usage reporting;

Uplink classifier to support routing traffic flows to a data network;

Branching point to support multi-homed PDU session;

QoS handling for user plane, e.g. packet filtering, gating, UL/DL rate enforcement;

Uplink traffic verification (service data flow (SDF) to QoS flow mapping);

Downlink packet buffering and downlink data notification triggering.

The SMF hosts the following main functions:

Session management;

UE IP address allocation and management;

Selection and control of UP function;

Configures traffic steering at UPF to route traffic to proper destination;

Control part of policy enforcement and QoS;

Downlink data notification.

In what follows, multi-RAT dual connectivity will be described. NG-RAN supports multi-RAT dual connectivity configured so that a UE in the RRC_CONNECTED state with multiple RX/TX may use radio resources provided by two separate schedulers. Multi-RAT dual connectivity is generalization of the E-UTRA dual connectivity. Two separate schedulers are located at two different NG-RAN nodes connected to each other through a non-ideal backhaul. One of the two different NG-RAN nodes performs the role of a master node (MN), and the other one performs the role of a secondary node (SN). In other words, one scheduler is located at the MN while the other scheduler is located at the SN. The two different NG-RAN nodes provide either the E-UTRA connectivity (when the NG-RAN node is an ng-eNB) or NR connectivity (when the NG-RAN node is a gNB). The ng-eNB is a node that provides the NR user plane and control plane protocol termination toward a UE and operates as an SN in the E-UTRAN-NR dual connectivity (EN-DC). The gNB is a node that provides the E-UTRA user plane and control plane protocol termination toward a UE and is connected to 5G CN through an NG interface. The MN and SN are connected to each other through a network interface, and at least the MN is connected to the core network. Although multi-RAT dual connectivity in the present specification has been designed based on a non-ideal backhaul between different nodes, the multi-RAT dual connectivity may also be used for an ideal backhaul.

Figure 5:
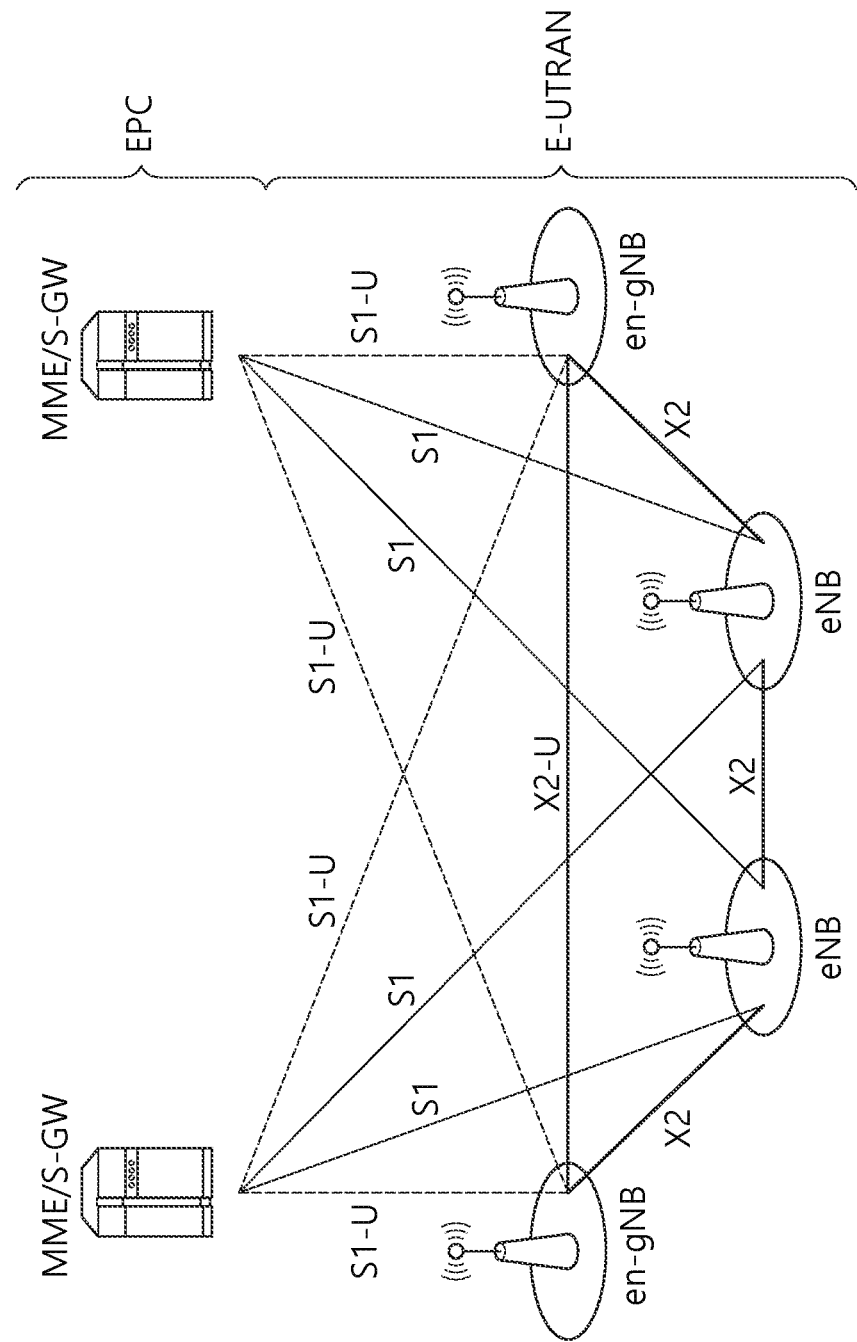
FIG. 5 shows EN-DC architecture.

FIG. 5 shows EN-DC architecture. The E-UTRAN supports multi-RAT dual connectivity through EN-DC, where a UE is connected to one eNB operating as an MN and one en-gNB operating as an SN. An eNB is connected to EPC through S1 interface and connected to en-gNB through X2 interface. The en-gNB may be connected to the EPC through S1-U interface and connected to a different en-gNB through X2-U interface.

The 5G CN also supports multi-RAT dual connectivity. An NG-RAN supports NG-RAN E-UTRA-NR dual connectivity (NGEN-DC), where a UE is connected to one ng-eNB operating as an MN and one gNB operating as an SN. The ng-eNB is connected to the 5G CN, and the gNB is connected to the ng-eNB through Xn interface. Also, the NG-RAN supports NR-E-UTRA dual connectivity (NE-DC), where a UE is connected to one gNB operating as an MN and one ng-eNB operating as an SN. The gNB is connected to the 5G CN, and ng-eNB is connected to the gNB through Xn interface.

The following three bearer types may be considered for dual connectivity of LTE/NR.

Split bearer through master cell group (MCG): This is similar to the option 3C of the dual connectivity architecture of the conventional LTE Secondary cell group (SCG) bearer: This is similar to the option 1A of the dual connectivity architecture of the conventional LTE.

Split bearer through SCG: Bearer split occurs at the secondary node.

Figure 6:
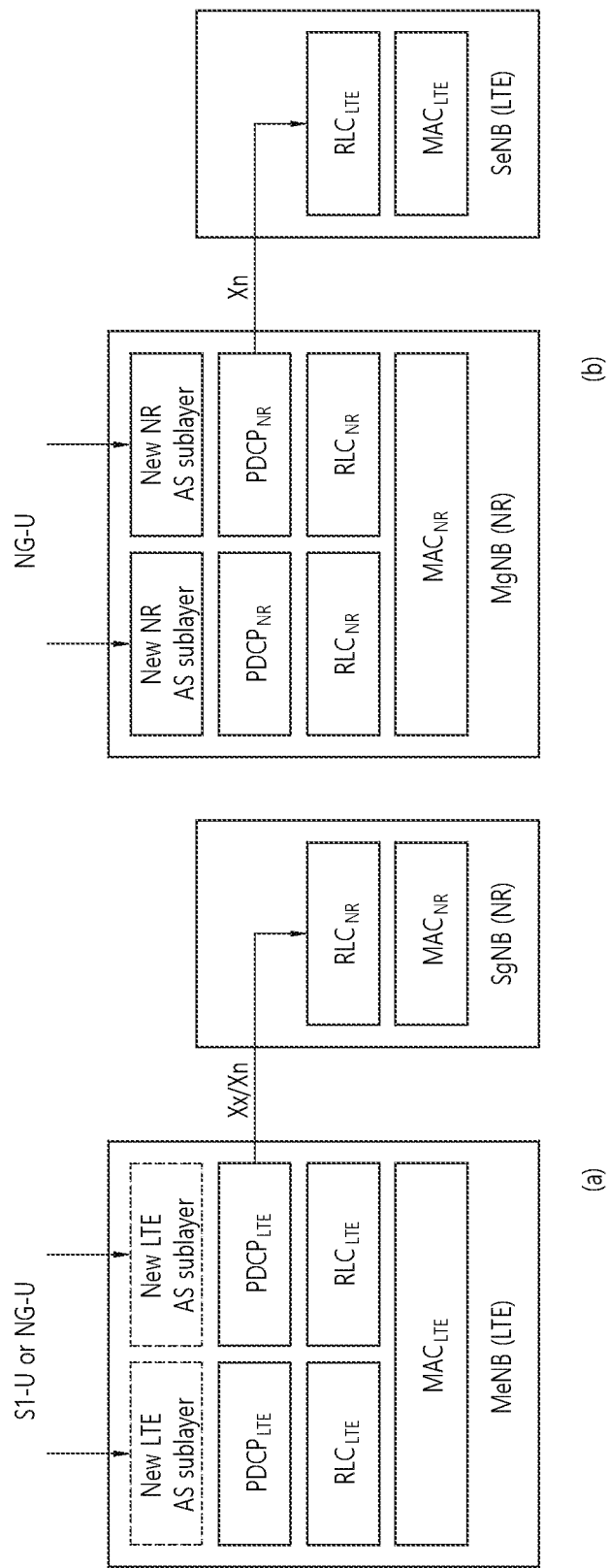
FIG. 6 shows a split bearer through MCG.

FIG. 6 shows a split bearer through MCG. In FIG. 6-(a), the master node is eNB (namely master eNB (MeNB)), and the secondary node is gNB (namely, SgNB). In FIG. 6-(a), MeNB/SgNB is connected to the core network through S1-U or NG-U. The MCG bearer is constructed in the MeNB side via a new LTE AS sublayer. A split bearer through MCG passes through the new LTE AS sublayer in the MeNB side, branches in the PDCP layer, and is delivered to the RLC layer of SgNB through Xx/Xn interface. In FIG. 6-(b), the master node is gNB (namely MgNB), and secondary node is eNB (namely secondary eNB (SeNB)). In FIG. 6-(b), MgNB/SeNB is connected to the core network through NG-U. The MCG bearer is constructed in the MgNB side via a new NR AS sublayer. A split bearer through MCG passes through the new NR AS sublayer in the MgNB side, branches in the PDCP layer, and is delivered to the RLC layer of SeNB through Xn interface.

Figure 7:
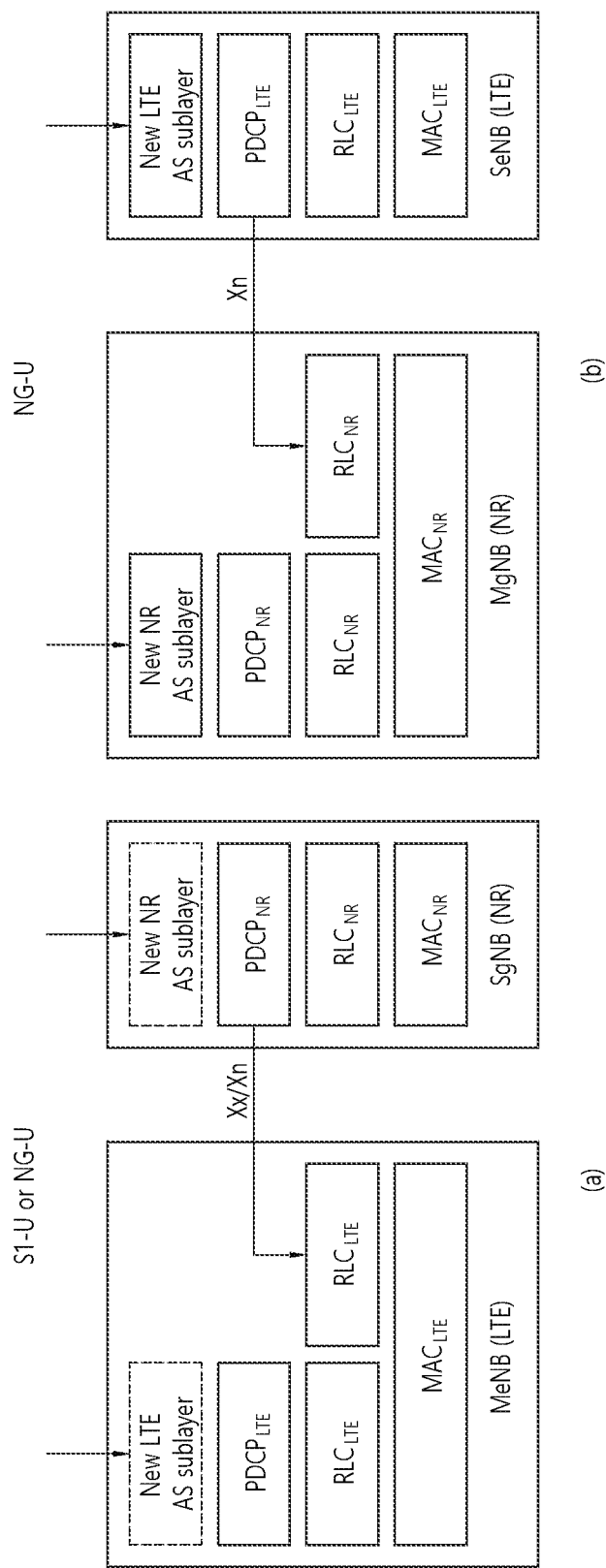
FIG. 7 shows a split bearer through SCG.

FIG. 7 shows a split bearer through SCG. In FIG. 7-(a), the master node is eNB (namely MeNB), and the secondary node is gNB (namely, SgNB). In FIG. 7-(a), MeNB/SgNB is connected to the core network through S1-U or NG-U. The MCG bearer is constructed in the MeNB side via a new LTE AS sublayer. A split bearer through SCG passes through the new NR AS sublayer in the SgNB side, branches in the PDCP layer, and is delivered to the RLC layer of MeNB through Xx/Xn interface. In FIG. 7-(b), the master node is gNB (namely MgNB), and secondary node is eNB (namely SeNB). In FIG. 7-(b), MgNB/SeNB is connected to the core network through NG-U. The MCG bearer is constructed in the MgNB side via a new NR AS sublayer. A split bearer through SCG passes through the new LTE AS sublayer in the SeNB side, branches in the PDCP layer, and is delivered to the RLC layer of MgNB through Xn interface.

The three bearer types mentioned above may be supported irrespective of a connected core network except for the split bearer through SCG when the master node is gNB. Related to reconfiguration of the bearer type, reconfiguration between an SCG bearer and MCG bearer, reconfiguration of the SCG bearer between two different secondary nodes, and reconfiguration between MCG bearer and MCG split bearer may be supported.

Figure 8:
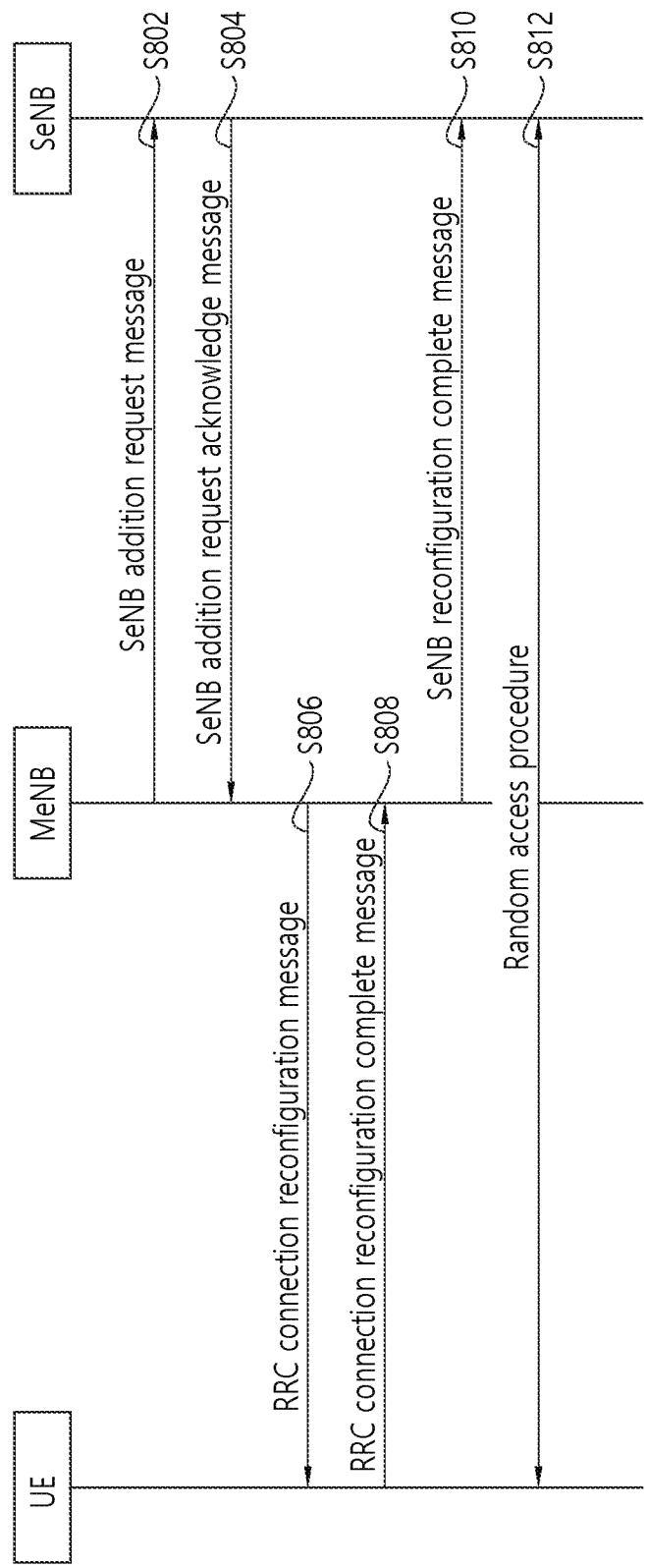
FIG. 8 shows an SeNB addition procedure for dual connectivity of the LTE.

FIG. 8 shows an SeNB addition procedure for dual connectivity of the LTE. The SeNB addition procedure is initiated by MeNB and is used for establishing UE context in the SeNB side. From the SeNB addition procedure, at least the first cell of SCG (primary second cell (PSCell)) is added.

In step S802, MeNB determines to request SeNB to allocate radio resources to a specific E-TRAN radio access bearer (E-RAB). MeNB may indicate E-RAB attributes (E-RAB parameter and transport network layer (TNL) address information corresponding to the bearer type). In addition, MeNB indicates, within SCG-ConfigInfo, MCG configuration to be used as a base for reconfiguration by SeNB and the overall UE capability for UE capability adjustment. However, SCG-ConfigInfo does not include SCG configuration. MeNB may provide the latest measurement result about an SCG cell requested to be added. SeNB may reject the request.

If a radio resource management (RRM) entity of SeNB may allow a resource request, in step S804, SeNB allocates radio resources and according to the bearer option, allocates transmission network resources. SeNB triggers random access so that synchronization of SeNB radio resource configuration may be performed. SeNB provides a new radio resource of SCG within SCG-Config to the MeNB. Related to the SCG bearer, SeNB provides new radio resources of the SCG together with S1 DL TNL address information about each E-RAB and security algorithm. Related to the split bearer, SeNB provides new radio resources of the SCG together with X2 DL TNL address information about each E-RAB.

If MeNB guarantees a new configuration, in step S806, MeNB transmits, to the UE, an RRC connection reconfiguration (RRCConnectionReconfiguration) message including a new radio resource configuration of the SCG.

In step S808, the UE applies the new configuration and responds with an RRC connection request reconfiguration complete (RRCConnectionReconfiguraitonComplete) message. If the UE is unable to use the configuration (or part thereof) included in the RRCConnectionReconfiguration message, the UE performs a reconfiguration failure procedure.

In step S810, MeNB informs SeNB that the UE has successfully completed the reconfiguration procedure.

In step S812, the UE performs synchronization toward PSCell of the SeNB. The order of the step for transmitting the RRCConnectionReconfigurationComplete message S808 and the step for performing a random access procedure toward the SCG S812 by the UE is not defined. A successful random access procedure toward the SCG is not requested for successful completion of the RRC connection reconfiguration procedure.

Afterwards, for the SCG bearer, according to the bearer characteristics of each E-RAB, MeNB may perform the operation for minimizing service interruption due to activation of dual connectivity (for example, data forwarding and delivery of sequence number state). Also, for the SCG bearer, an update of the user plane path toward the EPC may be performed.

In the conventional LTE, a message belonging to one RRC procedure has been exchanged only between a UE and one network node. For example, as shown in the SeNB addition procedure of FIG. 8, the RRC connection reconfiguration message that configures the RRC connection reconfiguration procedure and the RRC connection reconfiguration complete message which is a response message/subsequent message to the RRC connection reconfiguration message are exchanged only between the UE and MeNB. In other words, the UE may not receive an RRC connection reconfiguration message from MeNB and transmit the RRC connection reconfiguration complete message, which is a response message/subsequent message, to SeNB nor may the UE receive an RRC connection reconfiguration message from SeNB and transmit the RRC connection reconfiguration complete message, which is a response message/subsequent message, to MeNB. However, in the case of interworking of LTE/NR, even if messages belongs to one RRC procedure, the UE may need to receive a first message from a first network node and transmit a second message which is a response message/subsequent message to a second network node. More generally, a method may be needed, which specifically indicates the type of a bearer through which the second message, which is a response message/subsequent message of the first message, is transmitted.

To solve the problem above, the present invention proposes a method for indicating the type of a bearer used for the second message which is a response message/subsequent message of the first message in one RRC procedure. According to one embodiment of the present invention, a network node may indicate the type of signaling radio bearer (SRB) used for a specific RRC procedure or specific RRC message for the UE. The network node may be any one of eNB, gNB, ng-eNB, and en-gNB. The network node may indicate the type of an SRB used for a specific RRC procedure or specific RRC message for the UE by using UE-specific signaling or system information.

Figure 9:
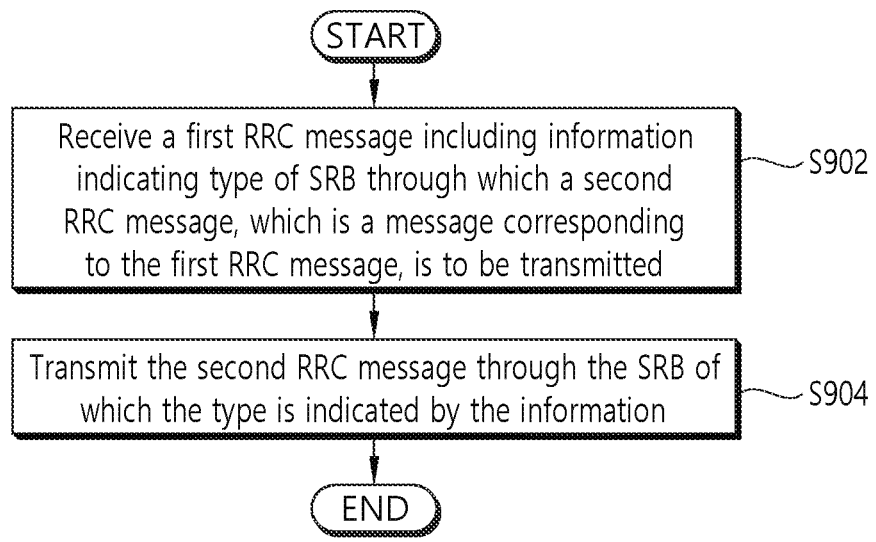
FIG. 9 shows a method for receiving information indicating the type of an SRB by a UE according to an embodiment of the present invention.

FIG. 9 shows a method for receiving information indicating the type of an SRB by a UE according to an embodiment of the present invention.

In step S902, the UE receives the first RRC message which includes information indicating the type of the SRB through which the second RRC message, which is a response message of the first RRC message, is transmitted. The type of the SRB may include the following.

MCG SRB: An SRB through which the UE may transmit an RRC message by using MCG transmission SCG SRB: An SRB through which the UE may transmit an RRC message by using SCG transmission Split SRB: An SRB through which the UE may transmit an RRC message by using MCG transmission or SCG transmission or both of the MCG and SCG transmission MCG transmission of split SRB: when this SRB type is indicated, the UE is unable to transmit the RRC message through SCG transmission of the split SRB stopped by the UE.

SCG transmission of split SRB: when this SRB type is indicated, the UE is unable to transmit the RRC message through SCG transmission of the split SRB stopped by the UE.

The first RRC message may also be received through any one of the aforementioned SRB types.

In step S904, the UE transmits the second RRC message through an SRB of which type is indicated by the information indicating the type of SRB.

As one embodiment of the present invention, the UE may receive a first message of the RRC procedure from a network node by using one SRB type. For example, the first message may be the RRC connection reconfiguration message or RRC connection setup (RRCConnectionSetup) message. However, the present invention is not limited to the specific message. The one SRB type may be any one of the aforementioned SRB types, i.e., the MCG SRB, SCG SRB, split SRB, MCG transmission of split SRB, and SCG transmission of split SRB. If the first message includes information about the type of the SRB or information about the type of the SRB has been indicated in advance for the UE through UE-specific singling or system information, the UE transmits a second message, which is the subsequent message of the RRC procedure, through the SRB of which type is indicated by the information about the type of SRB. For example, the UE may transmit the RRC connection reconfiguration complete message, which is the subsequent message of the RRC connection reconfiguration message, through the SRB of which type is indicated by the information about the type of SRB. Also, the UE may transmit an RRC connection setup complete (RRCConnectionSetupComplete) message, which is the subsequent message of the RRC connection setup message, through the SRB of which type is indicated by the information about the type of SRB. According to the information about the type of SRB, the type of SRB through which the first message is received and the type of SRB through which the second message is transmitted may be the same with or different from each other. In other words, according to the information about the type of an SRB, the network node from which the first message is received and the network node to which the second message is transmitted may be the same with or different from each other.

As another embodiment of the present invention, the UE may transmit the first message of the RRC procedure to a network node by using one SRB type. For example, the first message may be an RRC connection request (RRCConnectionRequest) message. However, the present invention is not limited to the specific message. The one SRB type may be any one of the MCG SRB, SCG SRB, split SRB, MCG transmission of split SRB, and SCG transmission of split SRB. If the first message includes information about the type of an SRB, the UE receives a second message, which is the subsequent message of the RRC procedure, through the SRB of which type is indicated by the information about the type of SRB. For example, the UE may receive the RRC connection setup message, which is the subsequent message of the RRC connection request message, through the SRB of which type is indicated by the information about the type of SRB. According to the information about the type of SRB, the type of the SRB through which the first message is transmitted and the type of the SRB through which the second message is received may be the same with or different from each other. In other words, according to the information about the type of the SRB, the network node that receives the first message and the network node to which the second message is transmitted may be the same with or different from each other.

In addition, if the second message includes the information about the type of an SRB or the information about the type of the SRB is indicated to the UE in advance through UE-specific signaling or system information, the UE transmits a third message, which is the subsequent message of the RRC procedure, through the SRB of which type is indicated by the information about the type of SRB. For example, the UE may transmit the RRC connection setup complete message, which is the subsequent message of the RRC connection configuration message, through the SRB of which type is indicated by the information about the type of SRB. According to the information about the SRB type, the type of an SRB through which the second message is received and the type of an SRB through which the third message is transmitted may be the same with or different from each other. In other words, according to the information about the SRB type, the network node that receives the second message and the network node to which the third message is transmitted may be the same with or different from each other.

In what follows, what is proposed by the present invention will be described with respect to a specific embodiment. The following embodiments apply the embodiment of the present invention described with reference to FIG. 9 to a specific RRC procedure.

1. Embodiment 1

As described in detail with reference to FIG. 8, in the SeNB addition procedure of the conventional LTE, the UE performs synchronization toward the PSCell of the SeNB after receiving an RRC connection reconfiguration message. The order of performing the step S808 in which the UE transmits an RRC connection reconfiguration complete message and the step S812 in which the UE performs a random access procedure toward SCG is not defined. For successful completion of the RRC connection reconfiguration procedure, it does not necessitate a successful random access procedure toward SCG. Therefore, if a random access procedure toward SCG has failed but an RRC connection reconfiguration procedure has been successfully completed, the network has to release the SCG. This operation may be the cause of unnecessary signaling overhead.

Accordingly, the embodiment 1 of the present invention proposes to use different SRB types for SN addition or SN modification. According to one embodiment of the present invention, the UE may receive an SN addition message (for example, RRC connection reconfiguration message) indicating SN addition from MN, and the UE may transmit, to SN, an SN addition complete message (for example, RRC connection reconfiguration complete message) that indicates completion of SN addition. In what follows, the SN addition procedure is described as an example. However, the present invention is not limited to a specific example but may also be applied to the SN modification procedure. In other words, in what follows, SN addition may be replaced with SN modification. The case where a message is received from MN and a subsequent message is transmitted to SN is only an example, and various combinations may be applied according to the present invention as follows.

(1) UE may receive an SN addition message from MN through MCG SRB and transmit an SN addition complete message to SN through SCG SRB.

(2) UE may receive an SN addition message from MN through MCG SRB and transmit an SN addition complete message to MN through MCG transmission of split SRB.

(3) UE may receive an SN addition message from MN through MCG SRB and transmit an SN addition complete message to SN through SCG transmission of split SRB.

(4) UE may receive an SN addition message from MN through MCG transmission of split SRB and transmit an SN addition complete message to SN through SCG SRB.

(5) UE may receive an SN addition message from MN through MCG transmission of split SRB and transmit an SN addition complete message to MN through MCG transmission of split SRB.

(6) UE may receive an SN addition message from MN through MCG transmission of split SRB and transmit an SN addition complete message to SN through SCG transmission of split SRB.

The SN addition message may include SCG security configuration used for SN. The UE may apply the SCG security configuration to the SCG SRB to which an SN addition complete message may be transmitted. Meanwhile, the UE may apply MCG security configuration to MCG SRB and split SRB. The MCG security configuration may be configured by MN before addition of SN.

MN may be eNB of the LTE, and SN may be gNB of NR. Similarly, SN may be eNB of the LTE, and MN may be gNB of NR.

While being connected to MN before transmitting an SN addition complete message, the UE may perform synchronization with an SCG cell indicated by the SN addition message and transmit a random access preamble to the SCG cell. If the UE receives a random access response that indicates the random access preamble from the SCG cell, the UE may transmit the SN addition complete message to SN.

In order for MN to transmit an SN addition message to the UE, SN may transmit an SN addition request message to MN. The SN addition request message may include cell ID of an SCG cell, configuration of a random access procedure such as a random access preamble used in the SCG cell and information about one or more beams (for example, synchronization signal (SS) block and SS block burst) used in the random access procedure. The information about one or more beams indicates which beam is to be used when the UE transmits a random access preamble or SN addition complete message, or when the UE receives a random access response.

The SN addition message received from MN may include the content of an SN addition request message transmitted by SN to MN. In other words, the SN addition message may include cell ID of an SCG cell, configuration of a random access procedure such as a random access preamble used in the SCG cell and information about one or more beams (for example, SS block and SS block burst) used in the random access procedure. Also, the SN addition message may include information that indicates which SRB type (namely any one of MCG SRB, SCG SRB, or split SRB) is used to transmit the SN addition complete message.

Figure 10:
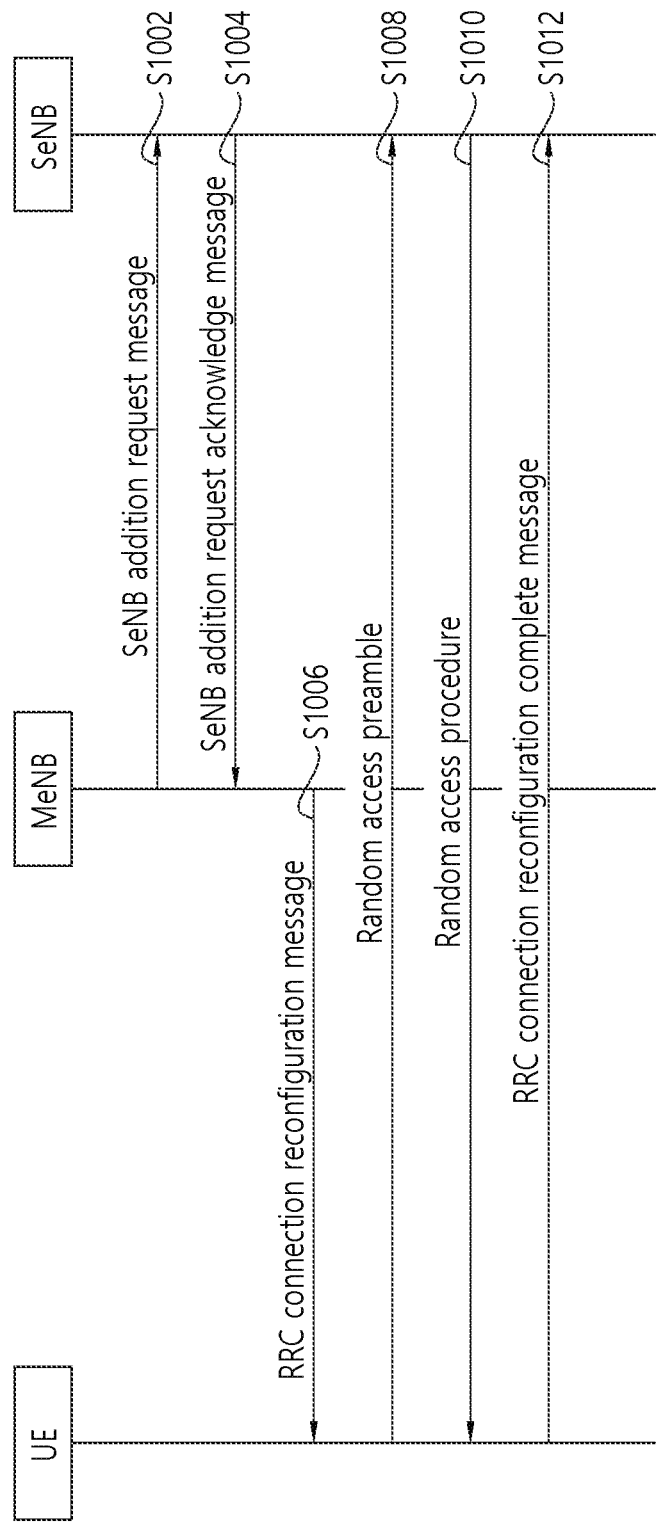
FIG. 10 shows an SN addition procedure according to one embodiment of the present invention.

FIG. 10 shows an SN addition procedure according to one embodiment of the present invention.

In step S1002, MN determines to request SN to allocate radio resources to a specific E-RAB. MN may indicate E-RAB attributes (E-RAB parameter and TNL address information corresponding to the bearer type). In addition, MN indicates, within SCG-ConfigInfo, MCG configuration to be used as a base for reconfiguration by SN and the overall UE capability for UE capability adjustment. However, SCG-ConfigInfo does not include SCG configuration. MN may provide the latest measurement result about an SCG cell requested to be added. SN may reject the request.

If an RRM entity of SN may allow a resource request, in step S1004, SN allocates radio resources and according to the bearer option, allocates transmission network resources. SN triggers random access so that synchronization of SN radio resource configuration may be performed. SN provides a new radio resource of SCG within SCG-Config to the MN. Related to the SCG bearer, SN provides new radio resources of the SCG together with S1 DL TNL address information about each E-RAB and security algorithm. Related to the split bearer, SN provides new radio resources of the SCG together with X2 DL TNL address information about each E-RAB.

If MN guarantees a new configuration, in step S1006, MN transmits, to the UE, an RRC connection reconfiguration message including a new radio resource configuration of the SCG. The RRC connection reconfiguration message may include information that indicates which SRB type (namely any one of MCG SRB, SCG SRB, or split SRB) is used to transmit the RRC connection reconfiguration complete message. Also, the RRC connection reconfiguration message may include SCG security configuration used in the SCG. The UE applies a new configuration (that includes the SCG security configuration). If the UE is unable to follow the configuration (or part of the configuration) included in the RRC connection reconfiguration message, the UE performs a reconfiguration failure procedure.

In step S1008, the UE performs synchronization toward PSCell of SN. The UE may perform the random access procedure toward SCG by transmitting a random access preamble indicated by an RRC connection reconfiguration message. When SN is gNB, the UE may transmit a random access preamble by using a beam indicated by the RRC connection reconfiguration message.

In step S1010, the UE receives a random access response that indicates the random access preamble.

In step S1012, the UE transmits an RRC connection reconfiguration complete message. The UE may transmit an RRC connection reconfiguration complete message by using a UL grant received from the random access response and/or a beam indicated by RRC connection reconfiguration message. If the RRC connection reconfiguration message received in step S1006 includes information that indicates which SRB type (namely any one of MCG SRB, SCG SRB or split SRB) is used to transmit the RRC connection reconfiguration complete message, the UE may transmit the RRC connection reconfiguration complete message on the SRB of which type is indicated by the information. FIG. 10 assumes that the RRC connection reconfiguration complete message is transmitted to SN. In other words, in FIG. 10, the RRC connection reconfiguration complete message is transmitted to SN through SCG SRB or SCG transmission of split SRB. Also, the RRC connection reconfiguration complete message may include a measurement result of a potential SCG cell to be added. Accordingly, SN may quickly add a new SCG cell based on the measurement result.

The SN, which has received the RRC connection reconfiguration complete message from the UE, may inform the MN that the UE has successfully completed a reconfiguration procedure.

Afterwards, for the SCG bearer, according to the bearer characteristics of each E-RAB, MN may perform the operation for minimizing service interruption due to activation of dual connectivity (for example, data forwarding and delivery of sequence number state). Also, for the SCG bearer, an update of the user plane path toward the EPC may be performed.

2. Embodiment 2

In the SeNB release procedure of the conventional LTE, after receiving an RRC connection reconfiguration message that releases SCG, the UE performs release of SCG SRB and transmits an RRC connection reconfiguration complete message to MCG. Although the MCG receives the RRC connection reconfiguration complete message from the UE, the MCG may confirm completion of SCG release again from the SCG. This operation may be the cause of unnecessary signaling overhead. If the UE is able to transmit the RRC connection reconfiguration message to SCG, it is not necessary for the MCG to transmit, to the SCG, a message that indicates completion of SCG release. Accordingly, additional signaling overhead may be prevented.

Accordingly, the embodiment 2 of the present invention proposes to use different SRB types for SN release. According to one embodiment of the present invention, the UE may receive, from MN, an SN release message (for example, RRC connection reconfiguration message) that indicates SN release and transmit, to SN, an SN release complete message (for example, RRC connection reconfiguration complete message) that indicates completion of SN release. In other words, the UE may receive the SN release message (for example, RRC connection reconfiguration message) through MCG SRB or split SRB and transmit the SN release complete message (for example, RRC connection reconfiguration complete message) through SCG SRB. In the following, although descriptions are given with respect to the SN release procedure, the present invention is not limited to the specific example and may also be applied to the SN modification procedure. In other words, in what follows, SN release may be replaced with SN modification.

MN may be eNB of the LTE, and SN may be gNB of NR. Similarly, SN may be eNB of the LTE, and MN may be gNB of NR.

While being connected to MN before transmitting an SN release complete message, the UE may release an SCG cell indicated by the SN release message. Unless there is a radio problem between the SCG and UE, the UE may transmit the SN release complete message to SN.

In order for MN to transmit an SN release message to the UE, SN may transmit an SN release request message to MN. The SN release request message may include cell ID of the SCG cell and RB configuration for releasing the SCG cell.

The SN release message received from MN may include information that indicates which SRB type (namely any one of MCG SRB, SCG SRB, or split SRB) is used to transmit the SN release complete message.

Figure 11:
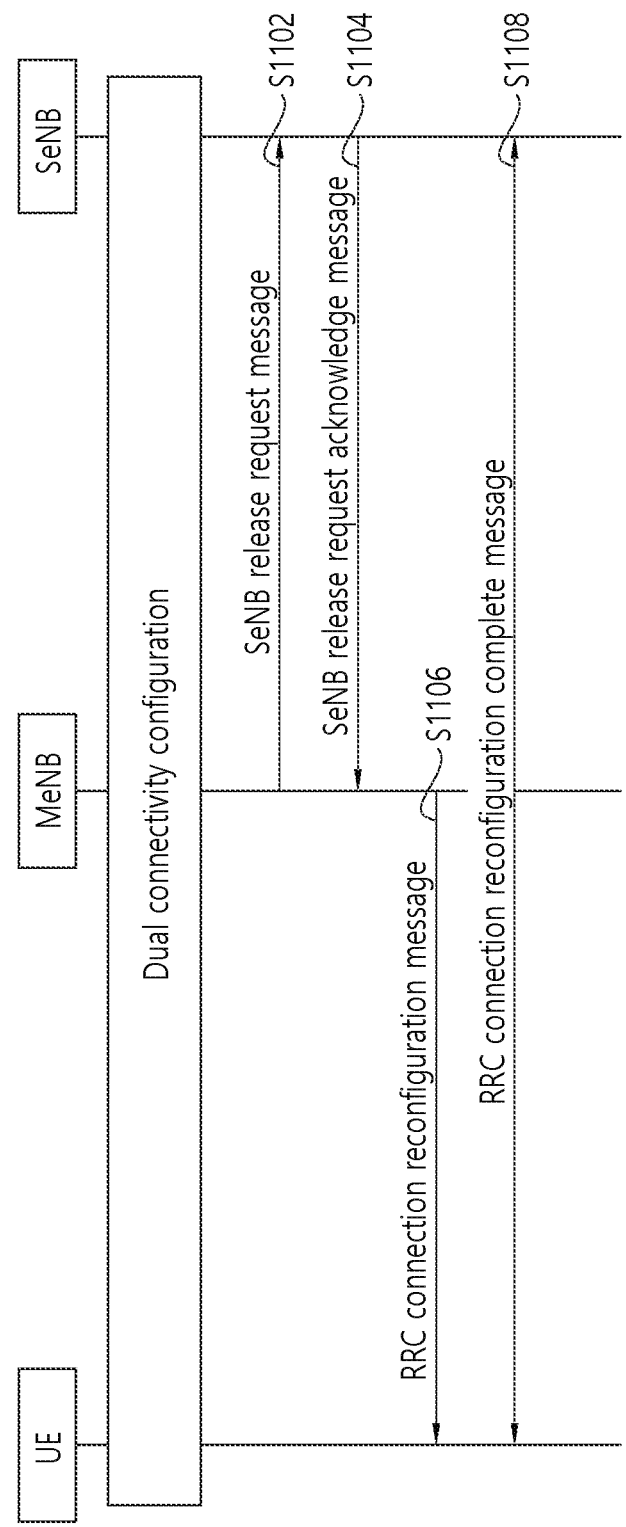
FIG. 11 shows an SN release procedure according to one embodiment of the present invention.

FIG. 11 shows an SN release procedure according to one embodiment of the present invention.

In step S1102, while dual connectivity is set up, MN determines to request SN to release radio resources with respect to a specific E-RAB. MN may provide the latest measurement result about an SCG cell requested to be released. The SN may not reject the request.

In step S1104, SN is ready to release radio resources.

In step S1106, as radio resources are to be released, MN transmits an RRC connection reconfiguration message that includes a radio resource configuration of the SCG through the MCG SRB to the UE. The RRC connection reconfiguration message may include information that indicates which SRB type (namely any one of MCG SRB, SCG SRB, or split SRB) is used to transmit the RRC connection reconfiguration complete message.

In step S1108, the UE applies the release configuration and responds with an RRC connection reconfiguration complete message. If the RRC connection reconfiguration message received in step S1106 includes information that indicates which SRB type (namely MCG SRB, SCG SRB, or split SRB) is used to transmit the RRC connection reconfiguration complete message, the UE may transmit the RRC connection reconfiguration complete message through the SRB of indicated type. FIG. 11 assumes that the RRC connection reconfiguration complete message is transmitted to SN. In other words, in FIG. 11, the RRC connection reconfiguration complete message is transmitted to SN through SCG SRB or SCG transmission of split SRB. Also, the RRC connection reconfiguration complete message may include a measurement result of a potential SCG cell to be added subsequently. Accordingly, SN may quickly add a new SCG cell based on the measurement result. If the UE is unable to follow the configuration (or part of the configuration) included in the RRC connection reconfiguration message, the UE performs a reconfiguration failure procedure.

Afterwards, for the SCG bearer, according to the bearer characteristics of each E-RAB, MN may perform the operation for minimizing service interruption due to activation of dual connectivity (for example, data forwarding and delivery of sequence number state). Also, for the SCG bearer, an update of the user plane path toward the EPC may be performed.

3. Embodiment 3

The conventional LTE does not support a split SRB. Therefore, in the SN addition procedure, the RRC connection reconfiguration complete message has always been transmitted to MN through MCG SRB. However, in NR, a split SRB may be supported for SRB1 and SRB2. MN may configure the split SRB in the SN addition procedure. Therefore, the UE may receive an RRC connection reconfiguration message used for adding SN together with configuration of the split SRB. The UE, which has received the RRC connection reconfiguration message, may need to configure the split SRB. However, the UE does not know which network node the RRC connection reconfiguration complete message corresponding to the RRC connection reconfiguration message has to be transmitted to.

Accordingly, the embodiment 3 of the present invention proposes to use the same transmission direction with respect to a split SRB for the SN addition/modification/release procedure. According to one embodiment of the present invention, if the UE receives a first message of a specific procedure on a specific transmission direction of a split SRB, the UE may transmit a second message of the specific procedure, which is a response/subsequent message of the first message, only on the same specific transmission direction of the split SRB. According to another embodiment of the present invention, if the UE transmits the first message of a specific procedure on a specific transmission direction of a split SRB, the UE may monitor/receive the second message of the specific procedure, which is a response/subsequent message of the first message, only on the same specific transmission direction of the split SRB. According to yet another embodiment of the present invention, if the UE receives the first message of a specific procedure on a specific transmission direction of a split SRB, the UE may transmit the second message of the specific procedure, which is a response/subsequent message of the first message, only on the specific transmission direction of the split SRB indicated by the first message. The specific transmission direction of the split SRB may be any one of MCG transmission direction, SCG transmission direction or MCG/SCG transmission direction.

In the SN addition procedure, according to one embodiment of the present invention, if the RRC layer of the UE receives an SN addition message (for example, RRC connection reconfiguration message) from MN through the MCG SRB, and the SN addition message configures a split SRB, the RRC layer of the UE may send an SN addition complete message (for example, RRC connection reconfiguration complete message) to the lower layer (for example, PDCP or RLC layer) of the UE through the MCG SRB, and the UE may configure the split SRB. The SN addition message is used for the UE to add an SCG. The MCG SRB is an SRB established only on the MCG between the MN and UE. The split SRB is an SRB established on the MCG and SCG between the MN and UE.

In the SN addition procedure, according to another embodiment of the present invention, if the RRC layer of the UE receives an SN addition message (for example, RRC connection reconfiguration message) from MN, and the SN addition message configures a split SRB, the RRC layer of the UE may configure a split SRB from the UE side, stop SCG transmission of the split SRB, and send an SN addition complete message (for example, RRC connection reconfiguration complete message) to the lower layer (for example, PDCP or RLC layer) of the UE through the split SRB. Therefore, the SN addition complete message is always transmitted only to MN through MCG transmission. After the SN addition complete message is transmitted, the UE may resume SCG transmission of the split SRB. The RRC/PDCP/RLC layer of the UE may determine the direction in which the SN addition complete message is to be transmitted among MCG transmission direction, SCG transmission direction, and one of the two transmission directions of the split SRB.

In the SN release procedure, according to one embodiment of the present invention, if the RRC layer of the UE receives an SN release message (for example, RRC connection reconfiguration message), the RRC layer of the UE may send an SN release complete message (for example, RRC connection reconfiguration complete message) to the lower layer (for example, PDCP or RLC layer) of the UE through the SCG SRB, and the SCG SRB may be released or stopped from the UE side. If the SCG SRB is stopped, the UE may release the SCG SRB after transmitting the SN release complete message. The SN release message is used for the UE to release the SCG. The SCG SRB is an SRB established only on the SCG between SN and UE.

In the SN release procedure, according to another embodiment of the present invention, if the RRC layer of the UE receives an SN release message (for example, RRC connection reconfiguration message), the RRC layer of the UE may send an SN release complete message (for example, RRC connection reconfiguration complete message) to the lower layer (for example, PDCP or RLC layer) of the UE through SCG transmission of a split SRB, and SCG transmission of the split SRB may be released or stopped from the UE side. If SCG transmission of the split SRB is stopped, the UE may release SCG transmission of the split SRB after transmitting the SN release complete message.

In the SN release procedure, according to yet another embodiment of the present invention, if the RRC layer of the UE receives an SN release message (for example, RRC connection reconfiguration message), the RRC layer of the UE may release or stop the SCG SRB from the UE side and send an SN release complete message (for example, RRC connection reconfiguration complete message) to the lower layer (for example, PDCP or RLC layer) of the UE through MCG transmission of a split SRB. If the SCG SRB is stopped, the UE may release the SCG SRB after transmitting the SN release complete message.

In the SN release procedure, according to still another embodiment of the present invention, if the RRC layer of the UE receives an SN release message (for example, RRC connection reconfiguration message), the RRC layer of the UE may release or stop SCG transmission of a split SRB and send an SN release complete message (for example, RRC connection reconfiguration complete message) to the lower layer (for example, PDCP or RLC layer) of the UE through MCG transmission of a split SRB. If SCG transmission of the split SRB is stopped, the UE may release SCG transmission of the split SRB after transmitting the SN release complete message.

The UE, which receives an RRC connection reconfiguration message that adds an SN while configuring a split SRB (with or without packet duplication), may configure the split SRB in the lower layer (along with packet duplication if configured) after transmitting an RRC connection reconfiguration complete message through the MCG SRB. In other words, the split SRB may be used only after the SN addition procedure. Similarly, if an RRC connection reconfiguration message that adds an SN configures the split SRB (with or without packet duplication), the UE may transmit the RRC connection reconfiguration complete message according to the configuration included in the RRC connection reconfiguration message only to the MN or only to the SN or to both of the MN and SN through the split SRB.

Meanwhile, a handover command message in NR may include at least cell ID and all of the information required to access a target cell. Accordingly, the UE may access the target cell without reading the system information. In a specific case, the handover command message may include information required for a contention-based or contention-free random access procedure. The information required for the random access procedure may include beam specific information. In this respect, the RRC connection reconfiguration message that adds an SN may also include information required for a contention-based or contention-free random access procedure. If SN is gNB, the information required for the random access procedure may include beam-specific information. The SN may provide, to the MN, information required for the random access procedure through SCG-Config.

Also, in NR, the SN release procedure may be triggered by MN or SN. Since SCG SRB may be configured, SN may inform the UE of the SN release through the SCG SRB. However, if the UE releases the SN, no further response may be made to the SN. Therefore, the SN release procedure may be performed in a similar way as the SeNB release procedure of the conventional LTE. In other words, for the SN release procedure initiated by MN or SN release procedure initiated by SN, MN may indicate release of the whole SCG configuration to the UE through the RRC connection reconfiguration message. The RRC connection reconfiguration message may be transmitted through the MCG SRB. Similarly, the RRC connection reconfiguration message may be transmitted through a split SRB before the UE releases the split SRB.

Also, the UE, which has received the RRC connection reconfiguration message that releases the SCG, has to release the whole SCG configuration. Therefore, the UE is unable to transmit the RRC connection reconfiguration complete message through the SCG. The UE has to transmit the RRC connection reconfiguration complete message to the MN like the conventional UE. If a split SRB is configured, the UE which has received an RRC connection reconfiguration message that releases the SCG has to change the split SRB to MCG SRB. Therefore, the UE may transmit the RRC connection reconfiguration complete message through the MCG SRB. Similarly, the UE which has received the RRC connection reconfiguration message that releases the SCG may stop SCG transmission of the split SRB.

4. Embodiment 4

If a radio link failure (RLF) is detected in the LTE system, the UE initiates an RRC connection re-establishment procedure. If the RRC connection re-establishment procedure is triggered, the UE performs cell selection, accesses the selected cell, and resumes data transmission after RRC connection reconfiguration. The RRC connection re-establishment procedure takes a relatively long time, and during the procedure, the UE is unable to communicate with the network. In the conventional RRC connection re-establishment procedure, the UE stops all of RBs except for SRB0. Therefore, the UE and network are not allowed to transmit user packers until the RRC connection re-establishment procedure is successfully completed.

Accordingly, the embodiment 4 of the present invention proposes a method for improving the RRC connection re-establishment procedure by using a split SRB and/or SCG SRB. Even during the RRC connection re-establishment procedure, the split SRB and/or SCG SRB may be in a good connection condition. Therefore, the UE may maintain the SRB/DRB on the SCG even when RRC connection re-establishment for a new primary cell (PCell) on the MCG is performed.

Figure 12:
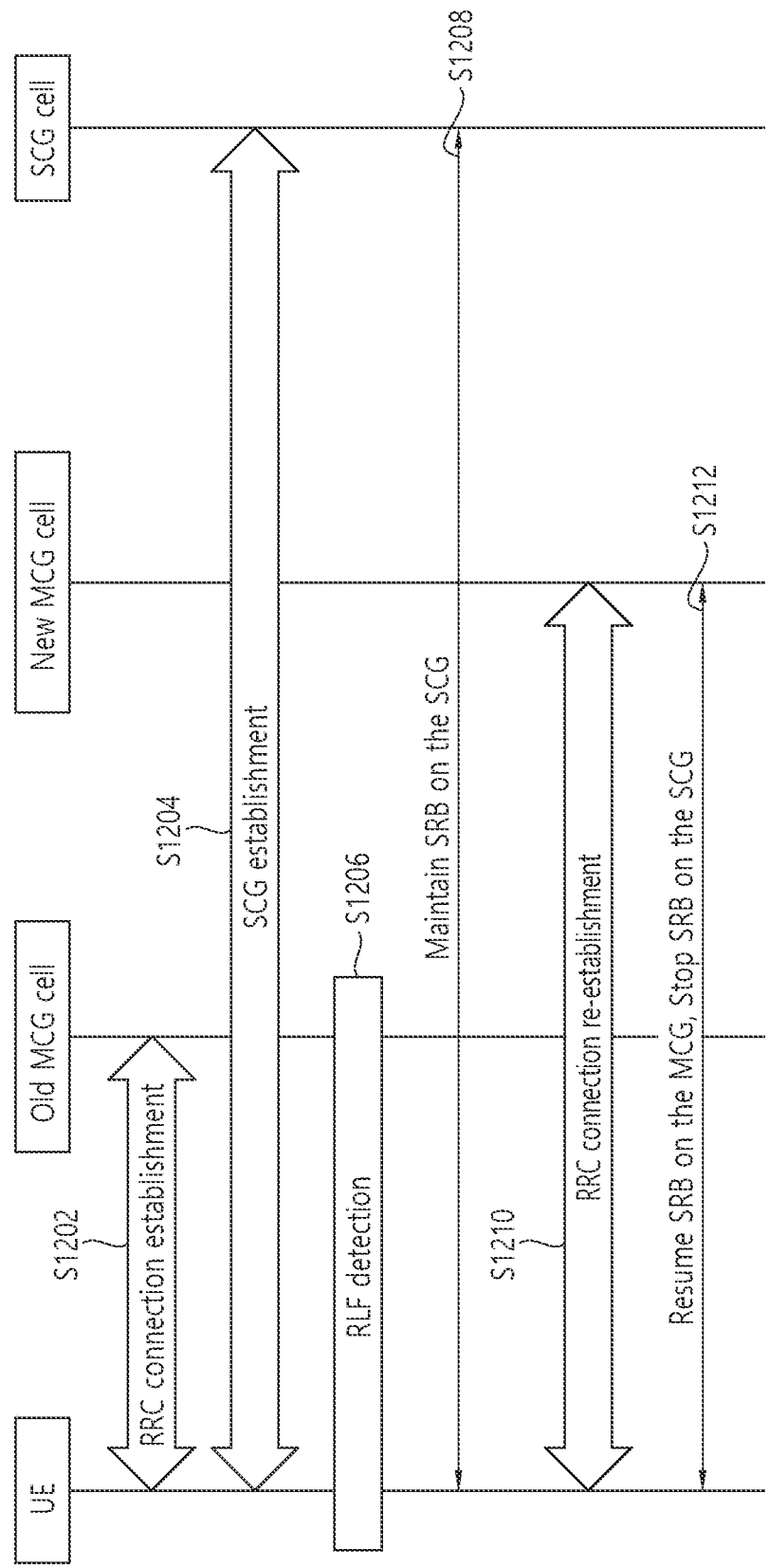
FIG. 12 shows an RRC connection re-establishment procedure according to one embodiment of the present invention.

FIG. 12 shows an RRC connection re-establishment procedure according to one embodiment of the present invention. FIG. 12 shows one example how the RRC connection is maintained on a split SRB in the occurrence of RLF.

In step S1202, an RRC connection is established between the UE and an old MCG cell. The UE may configure SRB1. In step S1204, an SCG connection is established between the UE and SCG cell. In the middle of establishing the SCG connection, MN may configure a split SRB and/or SCG SRB for the UE.

In step S1206, RLF occurs. Or, a handover failure or reconfiguration failure may occur. Accordingly, the UE triggers the RRC connection re-establishment procedure.

When a split SRB (namely MCG transmission of a split SRB and/or SCG transmission of the split SRB) is configured, in step S1208, the UE may maintain SCG transmission of the split SRB without stopping the SCG transmission. However, the UE may stop MCG transmission of the split SRB in the RRC connection re-establishment procedure. Similarly, instead of stopping the split SRB, the UE may select only the SCG transmission of the split SRB during the RRC connection re-establishment procedure. At this time, for the corresponding split SRB, the RRC layer of the UE may inform the PDCP layer of the UE that it has selected only the SCG transmission of the split SRB.

Also, when an SCG SRB is configured, the UE may maintain the SCG SRB during the RRC connection re-establishment procedure without stopping the SCG SRB.

In step S1210, an RRC connection is re-establishment between the UE and a new MCG cell.

The UE which has received an RRC connection re-establishment (RRCConnectionReestablishment) message may resume SRB1 and all of MCG transmission of split SRBs if configured in step S1212. Similarly, if a split SRB is configured, the UE which has received the RRC connection re-establishment message may select only the MCG transmission of the split SRB. At this time, for the corresponding split SRB, the RRC layer of the UE may inform the PDCP layer of the UE that it has selected only the MCG transmission of the split SRB.

Also, after transmission of the RRC connection re-establishment request (RRCConnectionReestablishmentRequest) message, after reception of the RRC connection re-establishment message, after transmission of the RRC connection re-establishment complete (RRCConnectionReestablishmentComplete) message, of after completion of the RRC connection re-establishment procedure, the UE may stop all of SCG SRBs/DRBs and SCG transmission of all of the split SRBs/DRBs if configured.

To summarize the description above, if RLF is detected, the UE initiates the RRC connection re-establishment procedure and if a split SRB and/or SCG SRB is configured during the RRC connection re-establishment procedure, the UE stops MCG transmission of the split SRB, however, the UE does not stop SCG transmission of the split SRB and/or SCG SRB. Therefore, the UE may maintain the RRC connection through SCG transmission of the split SRB and/or SCG SRB during the RRC connection re-establishment procedure. Similarly, if the split SRB is configured, the UE may select only the SCG transmission of the split SRB during the RRC connection re-establishment procedure without stopping the split SRB. Therefore, the UE may not perform transmission through MCG transmission of the split SRB.

As described above, an advantage of an operation using a split SRB and/or SCG SRB is that an RRC message such as a measurement report may still be transmitted on SCG while the RRC connection re-establishment procedure is performed. Also, since the RRC connection in this case is alive, for example, for a few hundreds of ms, SCG transmission of a split DRB may be used for transmitting user packets during the RRC connection re-establishment procedure. Therefore, the UE does not have to stop SCG transmission of all the split SRBs and/or all the SCG DRBs.

Also, if the RRC connection re-establishment procedure is initiated in the conventional LTE, the UE releases all the SCG configurations except for DRB configuration. However, according to one embodiment of the present invention described above, the UE does not have to release all the SCG configurations during the RRC connection re-establishment procedure.

Also, if RLF occurs in the conventional LTE, the UE selects a cell and performs re-establishment in the selected cell. This operation may still be needed even if the SRB is maintained on the SCG. This is so because the UE needs to access the PCell having good connectivity quality. Therefore, in the RRC connection re-establishment procedure, the UE may select a cell for PCell of the MCG and transmit an RRC connection re-establishment request message to the selected cell.

Also, if the UE receives an RRC connection re-establishment message from a selected cell in the conventional LTE, the UE resumes SRB1. It is clear in the LTE rel-15 that if the UE receives the RRC connection re-establishment message, MCG SRB has to be resumed. In other words, the UE which has received the RRC connection re-establishment message may resume SRB1 and MCG transmission of all the split SRBs if configured. Similarly, if a split SRB is configured, the UE which has received the RRC connection re-establishment message may select only the MCG transmission of the split SRB. However, it is unclear whether SCG SRB and/or split SRB may still be used after the UE receives the RRC connection re-establishment message.

In this respect, according to a determination of eNB/gNB, the UE may re-establish an RRC connection and/or continue to use/reconfigure/release the SCG resource after the RRC connection reconfiguration. Therefore, the UE which has received the RRC connection re-establishment message may stop SCG SRB and/or SCG transmission of the split SRB if configured. After RRC connection re-establishment, a target MN may resume/reconfigure/release SCG SRB and/or SCG transmission of the split SRB. Similarly, the UE which has received the RRC connection re-establishment message may release SCG SRB and/or SCG transmission of the split SRB if configured. SCG DRB and/or SCG transmission of a split DRB may also be processed in the same manner.

Figure 13:
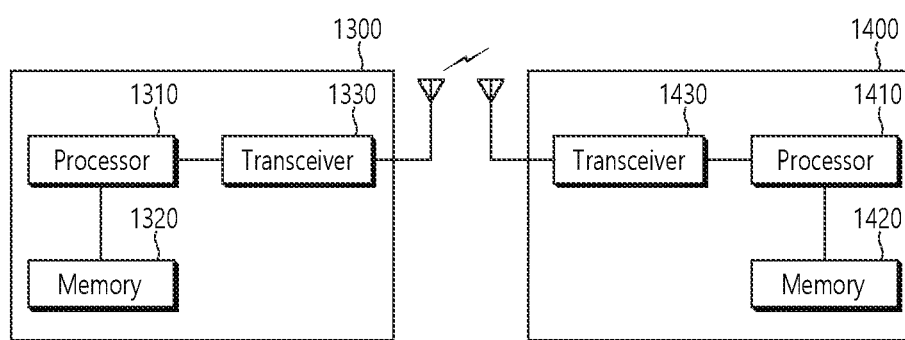
FIG. 13 shows a wireless communication system in which an embodiment of the present invention is implemented.

FIG. 13 shows a wireless communication system in which an embodiment of the present invention is implemented.

The UE 1300 includes a processor 1310, memory 1320, and transceiver 1330. The memory 1320, being connected to the processor 1310, stores various pieces of information for operating the processor 1310. The transceiver 1330, being connected to the processor 1310, may transmit a wireless signal to a network node 1400 or receives a wireless signal from the network node 1400.

The processor 1310 may be configured to implement proposed functions, processes and/or methods described in the present specification. More specifically, the processor 1310 may control the transceiver 1330 to perform the steps S902 and/or S904 of FIG. 9. The processor 1310 may control the transceiver 1330 to perform the steps S1006, S1008, S1010, and S1012 of FIG. 10. The processor 1310 may control the transceiver 1330 to perform the steps S1106 and S1108 of FIG. 11.

The network node 1400 includes a processor 1410, memory 1420, and transceiver 1430. The network node 1400 may correspond to any one of eNB, gNB, ng-eNB, and en-gNB. The network node 1400 may be either MN or SN described above. The memory 1420, being connected to the processor 1410, stores various pieces of information for operating the processor 1410. The transceiver 1430, being connected to the processor 1410, transmits a wireless signal to the UE 1300 or receives a wireless signal from the UE 1300.

The processor 1310, 1410 may include application-specific integrated circuit (ASIC), other chipset, logical circuit and/or data processing device. The memory 1320, 1420 may include read-only memory (ROM), random access memory (RAM), flash memory, memory card, storage medium and/or other storage device. The transceiver 1330, 1430 may include a baseband circuit for processing a radio frequency signal. When an embodiment is implemented by software, the aforementioned method may be implemented by a module (process or function) which performs the aforementioned function. A module may be stored in the memory 1320, 1420 and executed by the processor 1310, 1410. The memory 1320, 1420 may be installed inside or outside the processor 1310, 1410 and may be connected to the processor 1310, 1410 via various well-known means.

Figure 14:
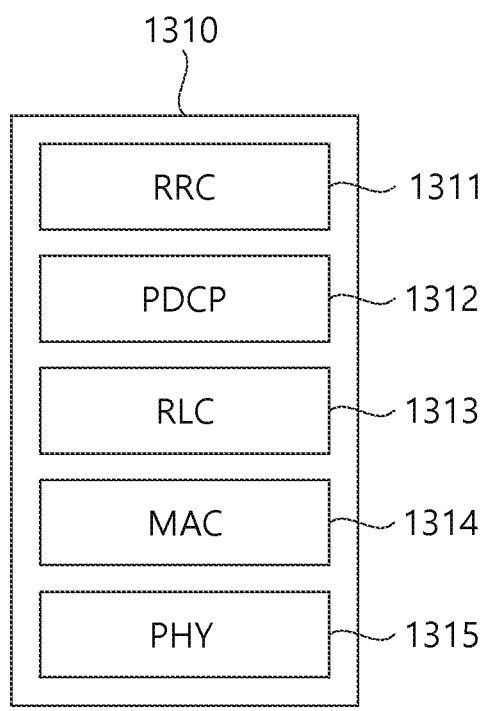
FIG. 14 shows a processor of the UE of FIG. 13.

FIG. 14 shows a processor of the UE of FIG. 13. The RRC layer 1311, PDCP layer 1312, RLC layer 1313, MAC layer 1314, and physical layer 1315 may be implemented by the processor 1310. The RRC layer 1311 may be configured to implement the function, process and/or method of the processor 1310.

Figure 15:
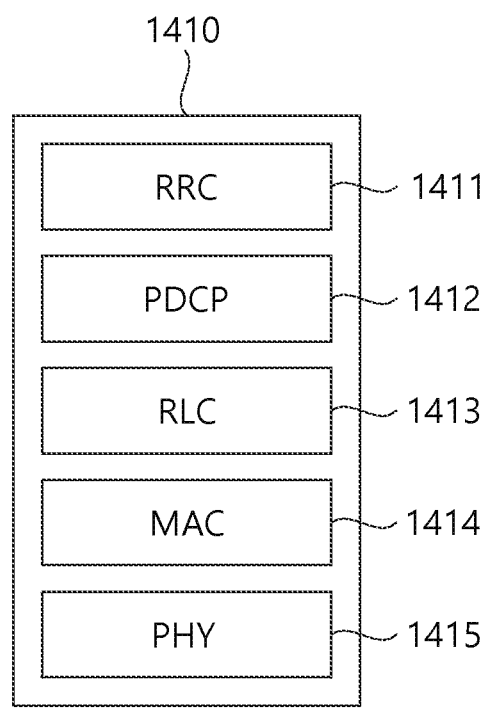
FIG. 15 shows a processor of the network node of FIG. 13.

FIG. 15 shows a processor of the network node of FIG. 13. The RRC layer 1411, PDCP layer 1412, RLC layer 1413, MAC layer 1414, and physical layer 1415 may be implemented by the processor 1410. The RRC layer 1411 may be configured to implement the function, process and/or method of the processor 1410.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What is claimed is:

1. A method performed by a secondary node (SN) in a dual connectivity (DC) in a wireless communication system, the method comprising,
    configuring, for a wireless device, a split bearer for both a master cell group (MCG) transmission and a secondary cell group (SCG) transmission with a master node (MN) in the DC;
    receiving, from the wireless device through the SCG transmission, a first RRC message, while the MCG transmission for the MN is suspended upon a MCG failure; and
    transmitting, to the wireless device through the SCG transmission, a second RRC message for resuming MCG transmission of the split bearer.

2. The method of claim 1, wherein the first RRC message includes information on the MCG failure.

3. The method of claim 1, wherein the method further comprises,
    maintaining the SCG transmission of the split bearer, while the MCG transmission for the MN is suspended.

4. The method of claim 1, wherein the split bearer is served by (i) a Packet Data Convergence Protocol (PDCP) entity and a first Radio Link Control (RLC) entity for the MN, and (ii) a second RLC entity for the SN.

5. The method of claim 4, wherein the split bearer is further served by a first Medium Access Control (MAC) entity for the MN and a second MAC entity for the SN.

6. The method of claim 1, wherein the second RRC message includes information on a cell selected for the resuming MCG transmission.

7. The method of claim 1, wherein the wireless device is in communication with at least one of a mobile device, a network, and/or autonomous vehicles other than the wireless device.

8. A method performed by a wireless device in a wireless communication system, the method comprising:
   establishing a split bearer for both a master cell group (MCG) transmission and a secondary cell group (SCG) transmission;
   upon detecting a Radio Link Failure (RLF) on a MCG while an SCG is not suspended:
      suspending the MCG transmission of the split bearer;
      transmitting a first radio resource control (RRC) message via the split bearer;
   upon receiving a second RRC message via the split bearer; and
      resuming MCG transmission of the split bearer.

9. The method of claim 8, wherein the wireless device is in communication with at least one of a mobile device, a network, or autonomous vehicles other than the wireless device.

10. The method of claim 8, wherein the method further comprises,
   maintaining the SCG transmission of the split bearer based on the detection of the RLF.

11. The method of claim 8, wherein the method further comprises:
   based on the detection of the RLF on MCG:
      selecting a cell as a primary cell for the MCG; and
      performing a Radio Resource Control (RRC) connection re-establishment procedure at the cell.

12. The method of claim 8, wherein the split bearer is served by (i) a Packet Data Convergence Protocol (PDCP) entity and a first Radio Link Control (RLC) entity for a first base station and (ii) a second RLC entity for a second base station.

13. The method of claim 12, wherein the split bearer is further served by a first Medium Access Control (MAC) entity for the first base station and a second MAC entity for the second base station.

14. A wireless device configured to operate in a wireless communication system, the wireless device comprising:
   a memory;
   a transceiver; and
   a processor connected to the memory and the transceiver, wherein the processor is configured to:
      establish a split bearer for both a master cell group (MCG) transmission and a secondary cell group (SCG) transmission;
      upon detecting a Radio Link Failure (RLF) on a MCG while an SCG is not suspended:
         suspend the MCG transmission of the split bearer, and
         control the transceiver to transmit a first radio resource control (RRC) message via the split bearer; and
      upon receiving a second RRC message via the split bearer:
         resume MCG transmission of the split bearer.

15. The wireless device of claim 14, wherein the wireless device is configured to be in communication with at least one of a user equipment, a network, or an autonomous vehicle other than the wireless device.

* * * * *